United States Patent
Hänsel et al.

(10) Patent No.: US 6,909,789 B1
(45) Date of Patent: Jun. 21, 2005

(54) METHOD OF PROCESSING POSTAL MATTERS

(75) Inventors: Karl-Günther Hänsel, Constance (DE); Walter Rosenbaum, Paris (FR)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/202,759

(22) PCT Filed: Apr. 26, 1997

(86) PCT No.: PCT/EP97/02167

§ 371 (c)(1),
(2), (4) Date: Feb. 28, 2000

(87) PCT Pub. No.: WO97/49503

PCT Pub. Date: Dec. 31, 1997

(30) Foreign Application Priority Data

Jun. 22, 1996 (DE) .......................... 196 24 977

(51) Int. Cl.[7] ................................ G06K 9/00
(52) U.S. Cl. ................ 382/101; 382/311; 235/454; 209/584
(58) Field of Search ................ 382/100, 101, 382/102, 106, 108, 112, 113, 140, 165, 175, 179, 180, 181, 187, 189, 193, 196, 200, 209, 220, 231, 232, 235, 236, 237, 290, 309, 310, 311, 321; 235/454, 462.1; 209/546, 509, 900, 584; 345/689, 32; 361/683; 348/116, 333.8; 358/474, 498, 496

(56) References Cited

U.S. PATENT DOCUMENTS

| | | | | |
|---|---|---|---|---|
| 4,641,753 A | * | 2/1987 | Tamada .................. | 209/546 |
| 4,992,649 A | * | 2/1991 | Mampe et al. ............ | 209/546 |
| 5,031,223 A | * | 7/1991 | Rosenbaum et al. ....... | 382/101 |
| 5,249,687 A | * | 10/1993 | Rosenbaum et al. ...... | 209/3.3 |
| 5,287,271 A | * | 2/1994 | Rosenbaum ............. | 705/8 |
| 5,697,504 A | * | 12/1997 | Hiramatsu et al. ........ | 209/546 |
| 5,805,474 A | * | 9/1998 | Danielson et al. ........ | 361/683 |

FOREIGN PATENT DOCUMENTS

| | | |
|---|---|---|
| DE | 43 04 082 A1 | 8/1994 |
| DE | 195 31 392 C1 | 1/1997 |
| EP | 0 424 728 B2 | 5/1991 |
| EP | 0 424 728 B1 | 5/1991 |
| EP | 0 424 728 A3 | 5/1991 |
| EP | 0 584 607 A2 | 3/1994 |
| EP | 0 589 119 A1 | 3/1994 |
| EP | 0 635 314 A1 | 1/1995 |
| JP | 8-101879 | 4/1996 |

OTHER PUBLICATIONS

English Language Translation of JP-8-101879.
Dr. Matthias Prasser, "A Vision of the Future", Automation, pp. 14–17, Jan. 1995.
Per Juul Nielsen "OCR Report Project—Appel d'offre de la Poste Danoise", version 1.1, Aug. 7, 1993.
Karl Heinz Reich, "Codage video adapte au tri automatique des lettres", European Conference dedicated to Postal Technologies, pp. 392–402, Jun. 14, 1993.
IBM Brochure "M.A.R.S.—IBM Automatic Mail Address Recognition System", May 1995.
Buchard/Russau "Die Post geht ab", TR Transfer 35/94, pp. 98–99.

* cited by examiner

*Primary Examiner*—Bhavesh M. Mehta
*Assistant Examiner*—Seyed Azarian
(74) *Attorney, Agent, or Firm*—Siemens AG; J. Eisenberg

(57) ABSTRACT

With a method for processing goods in an automatic reading system, for which an image of the address-containing surface of each item is obtained and transmitted to a first automatic evaluation and, in case of an incomplete evaluation of the address information, is transmitted to a first video coding for evaluation, it is provided that the address information of those images, which are not completely evaluated during the video coding, are transmitted to a further automatic evaluation by making use of the results of the video coding.

22 Claims, 3 Drawing Sheets

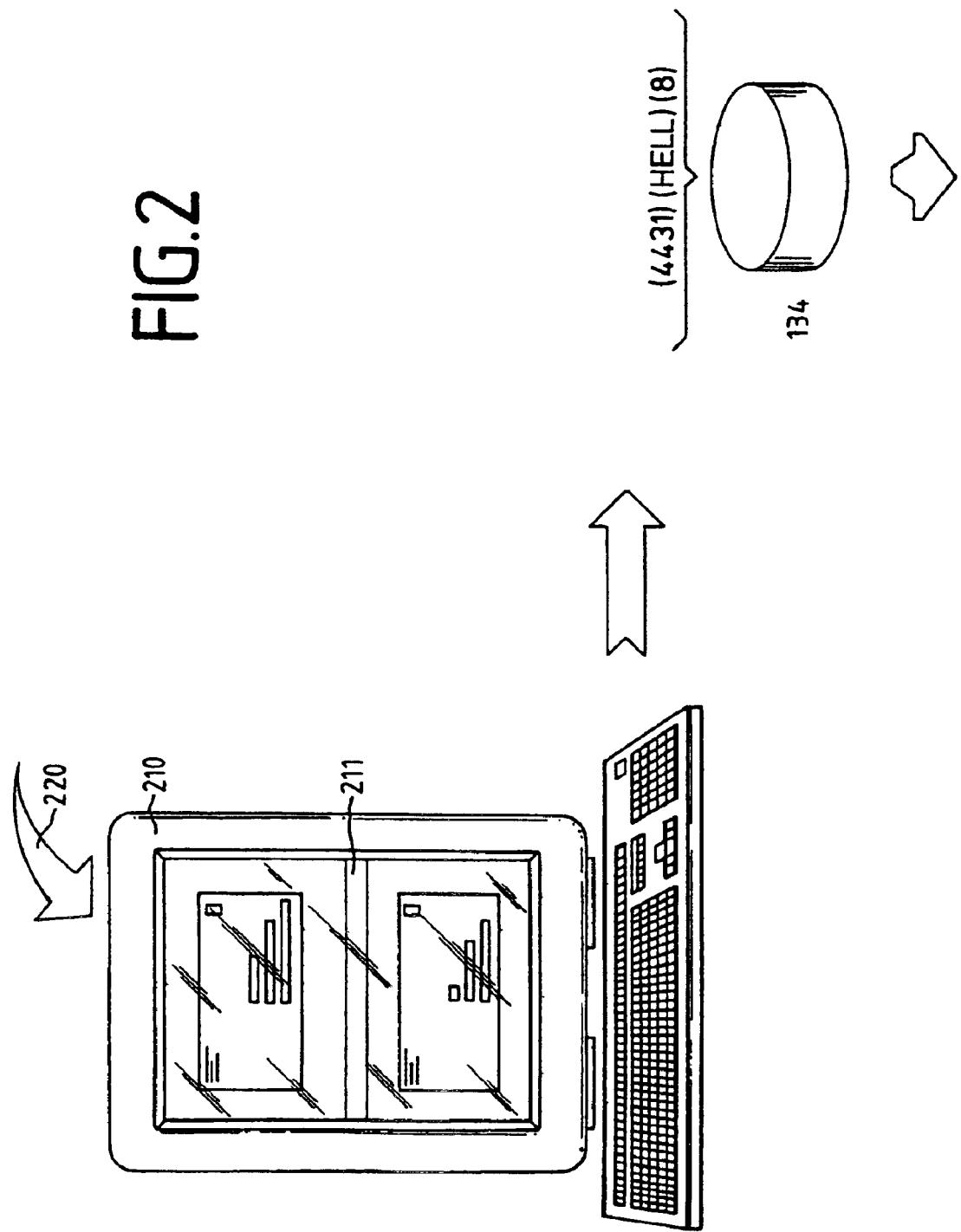

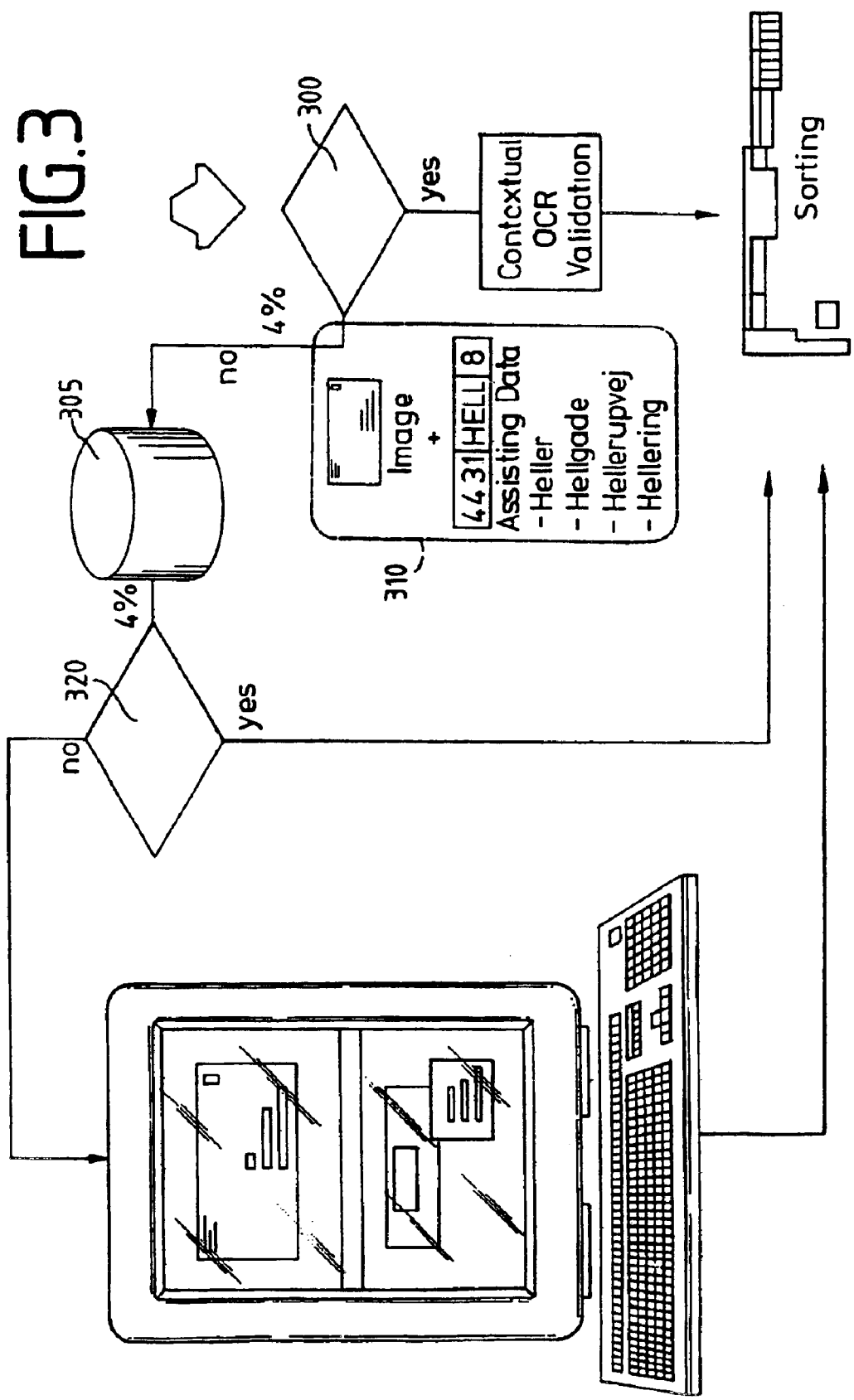

METHOD OF PROCESSING POSTAL MATTERS

FIELD OF THE INVENTION

The invention relates to automatic letter processing and in particular to systems, for which an automatic address reading method is supplemented and improved by the use of video coding during the address interpretation.

BACKGROUND OF THE INVENTION

Automatic address reading systems (OCR) are well known in the field of letter processing and are described, for example, in the DE 195 31 392. Modem OCR letter sorting systems can achieve letter processing rates of 10 letters per second, meaning 36,000 letters per hour and more. However, the recognition reliability varies considerably, depending on the lettering style and total quality of the address information affixed to the letter surface. In case of a successful recognition, the respective letter can be provided with a machine-readable bar code. This bar code permits a further mechanical processing up to a desired, optional sorting order. In particular, the use of bar codes permits a sorting of letters up to the sorting level of the postal run, for which the letters are sorted according to the distribution sequence used by the delivery person.

Owing to the fact that the recognition rates for automatic reading systems vary considerably, it is necessary to support these through various forms of manual intervention. The simplest intervention is that of rejecting letters not readable in automatic reading systems and using a hand-sorting process. However, the resulting expenses are uneconomically high, given the increasing operational expenses. Added to this is the fact that it is not possible to perform a mechanical sorting of such postal goods without problems at a later point in time, so that two separate flows of goods are created, which must then be combined again manually at a specific point in time.

In order to avoid these disadvantages resulting from the manual sorting of OCR rejected goods, various methods have been developed for a manual coding of postal goods. All these methods use operator intervention to affix bar codes to the goods in a manner that is consistent with the requirement to carry out a mechanical sorting with the same machines that process OCR-read and bar-coded mail.

Another method for coding rejected postal goods uses so-called manual coding stations. At these manually operated coding stations, the goods are physically presented one after another to an operator, wherein the operator encodes enough information for each of these goods, as is necessary to clearly identify the destination. For this, the input address is converted by means of a directory to a sorting bar code, which is then affixed to the item. The coded goods are subsequently processed further by means of bar code sorters (BCS), which are identical to OCR-suitable BCS. Manually operated coding stations of this type were first introduced by the US Post Office and the Royal Mail during the 1970's. The main disadvantages of systems of this type are the necessity to remove goods from the OCR flow of goods and the ergonomic difficulties experienced by the operator when identifying goods transported past the operator.

The next progressive step in the treatment of OCR-rejected goods was the development of on-line video coding systems (OVS). In an OVS, a video image of the item is presented to the operator for coding in place of the physical item at the manual coding stations. The video image is shown to the operator while the physical goods are held in delay loops. In these delay loops, the goods are normally held in motion for an interval that is sufficient for the OVS operator to input the necessary sorting information for the respective image. The standard delay loops permit delays of between 10 and 30 seconds. The longer the delay loop, the higher the costs as well as the requirements for maintenance and the physical size of the facility.

The main problem when using OVS is that the available time is only sufficient for a careful input of the zip code (zip) or the postal code (pc), unless delay loops with an impractical length are used.

For that reason, special coding methods were developed to keep the on-line delay time as low as possible.

In order to increase the coding productivity and/or permit the listing of all address elements, meaning the zip code/postal code, street/post office box, addressee/post office box, addressee/firm, various state-of-the art methods have been developed. Essentially, these include:

Preview Coding

The preview coding involves a simultaneous display of images from two goods, one above the other. In this case, the lower image is the active one, meaning its data are encoded. Following a suitable training, the operators can encode the information on the lower image while at the same time recording the address information from the upper image. The upper image subsequently becomes active and the process is continued. The preview coding permits a doubling of the operator productivity through a complete overlapping of the cognitive and the motorized functions during the coding of successive images.

Extraction Coding

Since only the zip/postal code address elements can be input reliably by the operator, given the on-line delay times that are possible in practical operations, specific key components of the address components referring to the street are input during the extraction coding. The extraction coding normally is based on specially developed rules, for which a code window length is used as an access key to an address directory. For example, the Royal Mail uses an extraction formula that is based on the first three and the last two letters. In that case, the operator must memorize special rules to avoid superfluous address information and must take into account specific, differentiating characteristics, e.g. directions such as east, west or categories such as street, lane, road.

Despite a certain effectiveness, the extraction coding has several considerable disadvantages. In particular, it has complex extraction rules, which frequently require taking into account the end of a street name while these components normally are written with the least amount of clarity. They also involve a significantly high rate of extractions that are not clear and for which several entries in a directory correspond to the extraction code, so that a clear sorting decision cannot be made. Furthermore, it must be taken into account that the input productivity of the operators is reduced as soon as the operator must make decisions instead of performing a simple, repetitive keyboard entry.

Completion Coding

In contrast to the extraction coding, a variable input is made for the completion coding for each address to be encoded. During the input, the address is essentially aligned with the address directory, until these clearly coincide. An acceleration effect is achieved by displaying the remainder of the address as soon as it is recognized that these clearly coincide in part. However, with this technology problems occur in that an input stop signal must be transmitted to the operator and an illustration of the identified remainder of the address is necessary, which leads to a reduced input productivity and prevents a preview coding.

Operator-Assisted OCR Technology

The US Postal Service has experimented with operator-assisted OCR techniques to increase the address information to be processed on line. In this case, the portion of the address image, for which the OCR identification has failed, is emphasized to increase the effectiveness. Since the operators are slow when deciphering missing letters and since in part complex identification errors, e.g. segmenting problems, occur as well, the operator productivity with this method is frequently lower than with a simple re-entering of the respective address.

Off-line Coding

Since a sufficiently high productivity for on-line coding cannot be achieved with any of the above-mentioned coding techniques, an off-line coding system was recently introduced, e.g. as described in the US PS 49 92 649. With this system, goods with Unidentified addresses are provided with an additional information, a tracking identification (TID). The unidentified goods are stored externally while the images of these goods are presented to operators for coding, wherein no time limits exist for this. The goods are subsequently presented to TID readers. The TID is linked to the entered address information. Based on this, a standard bar code sorting information can also be affixed to the item, so that the respective item can be processed in the same way as goods that are normally OCR-read. Even though the off-line video coding method is an effective method for coding all address components, the further processing of goods with addresses that have not been read requires additional capacities and a correspondingly complex logistic.

SUMMARY OF THE INVENTION

It is the object of the present invention, to achieve the highest possible on-line coding of letter goods and the lowest possible rate of goods where the address has not been read successfully. This object is solved according to the invention by the features in the independent patent claims.

The invention permits an improved integration of automatic reading systems and video coding. The invention furthermore permits the effective use of an extraction coding in integrated, automatic and video coding systems, in particular it permits a simplification of the decision problem for the operator during the address coding. Another advantage of the method according to the invention is that additional sorting information can be evaluated effectively, e.g. information referring to the name line in the address. The invention has the added advantage of making it possible to deal effectively with inconsistencies, which can result, for example, from the extraction coding or inscription errors made by the sender. The method also permits a simple integration of on-line and off-line coding, as well as the preview coding method.

Advantageous embodiments of the invention follow from the dependent claims and the description.

BRIEF DESCRIPTION OF THE FIGURES

The invention is illustrated in the following with the aid of exemplary embodiments and drawings. In detail, these show:

FIGS. 2 and 3 An overview of the data flow according to the invention.

FIG. 1 shows a schematic representation of a letter distribution facility for implementing the method according to the invention. The OCR letter sorter 100 comprises a feeding device 110, which pulls successive goods from a magazine 111 and transports these at approximately 10 goods per second to a high-resolution video scanner 120. Following this, the goods are transported along a delay loop 121. The goods normally have address information on their surfaces. The OCR processor 130 is used for an evaluation of the address information on the images for the goods, obtained with the video scanner 120. If the evaluation is completed, a bar code printer 150 is actuated and the item is provided with a corresponding bar code for the subsequent sorting into sorting compartments 160.

Figure 1:
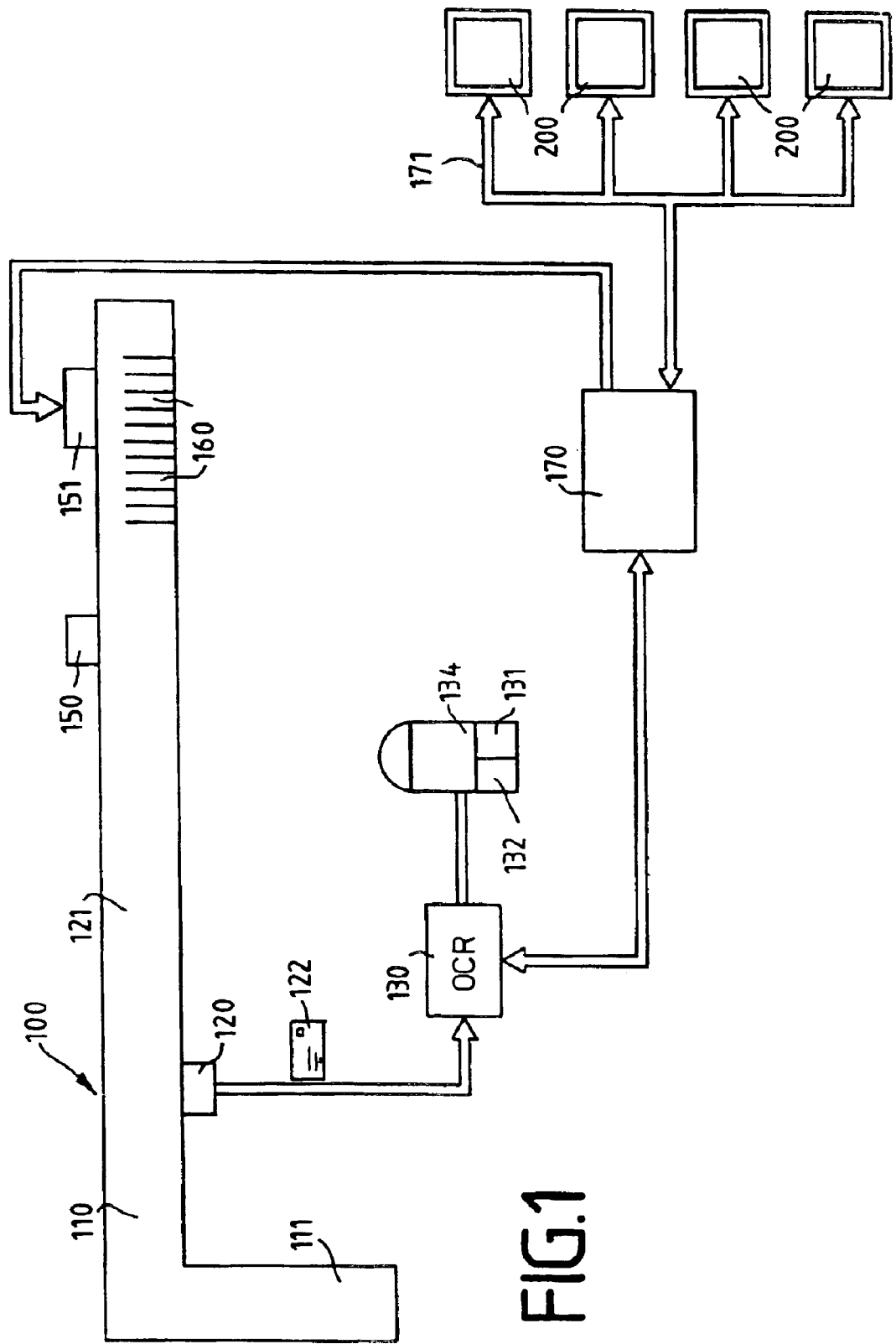
FIG. 1 A schematic representation of a device for carrying out the method.

The OCR processor 130 comprises one or several microprocessors 131 with associated memory 132 for storing the images of the goods. The OCR processor furthermore comprises an address directory 134 with zip codes, city names and street names and possibly additional address-related information. During the evaluation of the images containing address information, a reduction, controlled by characteristics, of the entry obtained through the address directory occurs, such that a sort of partial dictionary is created. Reliability factors are associated during the individual entries, so that during the evaluation a number of data from correctly identified addresses are generated. The device furthermore contains an image controller 170, as well as a number of video coding stations 200, which are connected directly to the image controller 170 or via a local area network (LAN) 171. If the OCR evaluation of an image is not or not completely successful, this image is transferred from the OCR processor 130 to the image controller 170, which controls on the one hand the TID bar code printer 151 and, on the other hand, sends the corresponding image to one of the video coding stations 200. The TID bar code printer 151 affixes an identification code TID to the corresponding item, which makes it possible to link the evaluated address information at a later time to a physical item. In that case, the images are preferably evaluated off-line, even though an on-line evaluation through video coding is basically possible, given a sufficiently long delay time. In the latter case, the TID can also be affixed to the goods at a later point in time, meaning if the video coding did not result in a complete evaluation within a predetermined, specific time interval.

In order to implement another and better illustrated method, the image controller 170 is designed such that address information, which is not completely evaluated by the video coding, is supplied to another automatic address evaluation device, using the results from the video coding in the OCR processor.

The FIGS. 2 and 3 show data-flow diagrams. The operators preferably work with divided displays 210, of which the upper one permits a preview and the lower one is normally the active one. Data input by the operator are shown in the prompt line 211. Images of goods that were not completely evaluated automatically are transmitted to the video coding 210. The example in FIG. 2 depicts the input of a zip code "4431," an extraction code for the street name "Hell," as well as the house number "8." Display forms other than a divided display can be used as well. This input information is used to identify matching entries in the address directory 134. A complete evaluation of the address information of the respective image basically has occurred if a clear coordination between the input information and an entry to the address directory 134 was found. However, such an unambiguous coordination cannot be achieved for a certain percentage of entries because a number of different address entries correspond to the coded address information.

According to FIG. 3, a decision 300 is made to decide whether the address information of an image was evaluated completely during the video coding. If the decision is positive (Yes), then the respective item can be provided either with a bar code if the delay time was sufficient to carry out an on-line video coding, or a corresponding linking takes place between the TID and a bar coding, based thereon. In any case, the respective item can be sorted further with standard means. In case of a negative decision (No), the invention provides for another automatic evaluation by using the results of the video coding, meaning that for this further automatic evaluation, the information obtained through video coding is available to the OCR processor in addition to the information shown on the image. In the above example, this is the triple information "4432," "Hell," "8." In FIG. 3, this is expressed symbolically by the content of circle 310. This is followed by a decision 320 on whether a complete evaluation of the respective image has taken place. In the positive case (Yes), the respective information is used for the further sorting of the item, in the same way as following a positive decision at decision point 300. If the decision is negative (No), another video coding takes place using the results the additional automatic evaluation. In this case, the operator is preferably presented with a number of alternatives to be selected, from which a selection must be made.

It is preferable if the last two stages of the method, namely the additional automatic evaluation as well as the additional video coding, do not take place on-line, but off-line because the available delay time is too short for an on-line implementation.

The method according to the invention thus contains three phases that act in combination. These are:

1. The phase for data input through video coding, where a coding of certain parts of the address information takes place, preferably with a simple extraction code. During this process, the zip/postal code information as well as a larger portion of the additional address information is normally evaluated completely or the locality names are extracted if the zip/postal code is missing. A first-automatic evaluation of the address information already preceded this phase. The input is preferably shown with a divided display. In order to simplify the input, a simple extraction code is used, e.g. a 4-digit postal code, the first four alpha characters of the street name and the digits for the house numbers of the respective addresses. With this extraction coding, an adaptation to the respective postal conventions is possible without problems. For example, the number of first letters can be varied. Preferably, the operator will input the postal code only if the OCR evaluation did not show any result at all. Thus, the input of street information will apply to most of the postal goods. A structuring of the video coding preferably can also occur in that one group of operators enters the postal code and street information while another group enters street information only. Since a specific percentage of the mail nowadays contains post office box information, a suitable key space on the keyboard should preferably be assigned as a post office box key, which can be depressed by the operator if necessary. Following this, the post office box number is entered. With company addresses, which lack street data or post office box data, it is also possible to enter the company line.
2. Further automatic evaluation, using information that was entered during the previous phase with the aid of video coding. The additional information increases the probability of a complete evaluation during the further automatic evaluation. An additional automatic evaluation takes place if the address information was not evaluated completely during the preceding phase. If an extraction code is used, two or more entries exist in the address directory for this. With a suitable extraction coding, only two address entries exist for more than 90% of the cases.
3. Additional video coding of those images, which could not be evaluated completely during the previous phases. Images of the non-evaluated addresses are preferably presented to the operator, together with the results from the preceding video coding and the automatic evaluation of the second phase two. The operator must then preferably select only one option from the predetermined alternatives. Additional context information is subsequently available for further automatic evaluation. That is to say, the number of address entries to be considered is limited by the number of candidates obtained through the extraction coding. It can be assumed that the correct address is among these candidates. The house number is normally also known. The further video coding of such address information, which was not evaluated completely during the preceding phases, is preferably used to process unclear results of the extraction coding or additional sorting-relevant information on the addressee line. The operator is preferably presented with successive images of the item surface, wherein the evaluation options of the address or the addressee are shown in one window. The options can be selected either through keyboard input of a selection number or via a mouse or voice processor.

One preferred embodiment of the invention provides for an evaluation of a first component of the address information and an evaluation of a second component of the address information as well as a check of the evaluation results with respect to mutual consistency. The first component of the address information in particular can be the zip or postal code, the second component can be a street or a house number. Inconsistencies between both components may be due, for example, to reading errors or an incorrect listing of the zip or postal code. In case of a wrong information, a number of alternatives for the street name are obtained, starting with the first three or four digits of the zip or postal code. The operator performs an extraction coding of the second component of the address information, which also results in a number of suggestions for the street name. During the consistency check, only those suggestions are not rejected, for which the results of these two analyses are mutually compatible.

The aforementioned embodiment is explained in further detail in the following with the aid of two examples. On one item, the address is listed as:

Bucklestr. 5

D-78457 Konstanz in place of the correct address:

Bücklestr. 5

D-78467 Konstanz

In that case, "78457 Buck 5" is used to obtain the entry "Buckley 5, Konstanz" from a street directory during an extraction coding. This is a correct association of the incorrect zip code 78457. During the consistency check, the inconsistency of "Bucklestr." And "Buckley" is detected through automatic evaluation and the respective evaluation result is rejected. On the other hand, if the address line with zip code and location information is read with a high error rate OCR, whereas the street information is read with a low error rate, the operator only enters the zip code or a number of letters from the location information. It is preferable in this case if the OCR result with low error rate is given preference over the operator input.

In another preferred embodiment of the invention, the information affixed to the surfaces of goods is evaluated through video coding in those cases where an automatic evaluation was not successful because the address information and the addressee information could not be differentiated by the automatic evaluation device. In particular, this occurs with mail goods where the addressee information is affixed immediately above or below the address information, e.g. with mail from Denmark. Since the item surface is displayed for the operator during the video coding, it is normally easily possible to identify the respective information as address information or addressee information and, if necessary, to perform an extraction coding.

What is claimed is:

1. A method for sorting goods by destination address included on a surface thereof, comprising the steps of:

generating an image of said surface;

decoding said image with OCR means so as to arrive at an unambiguous portion of said destination address;

if said portion is not unambiguously decoded,
 i. transmitting said image to a video coding workstation;
 ii. manually entering a prespecified and fixed number of alpha/numeric characters following a predetermined coding rule within a specific time interval during the viewing coding;
 iii. querying a database via a search based upon said fixed number of keystrokes;
 iv. obtaining a limited set of database entries, said set limited by said search; and
 v. transmitting said limited set back to said OCR means; and retrying decoding of said image with said OCR means based upon said limited set so as to produce an unambiguously decoded portion.

2. The method according to claim 1, wherein if said portion is unambiguously decoded, repeating said above steps for other portions of said destination address until a sorting decision is unambiguously determined.

3. The method according to claim 1, wherein said fixed number of keystrokes is a rule based number reflecting local application.

4. The method according to claim 1, wherein said number of alpha/numeric characters correspond to a manually read portion of said image.

5. The method according to claim 1, wherein said step of manually entering is performed via voice recognition means.

6. The method according to claim 1, wherein said step of manually entering is performed via manual entering means.

7. The method according to claim 6, wherein said manual entering means comprises one of a keyboard, mouse, keypad, touch screen, and stylus.

8. The method according to claim 1, wherein said step of querying is performed at said workstation.

9. The method according to claim 8, wherein said database is integral with said workstation.

10. The method according to claim 8, wherein said database is remote and functionally associated with said workstation.

11. The method according to claim 1, wherein said step of querying is performed by said OCR means.

12. The method according to claim 11, wherein said database is integral with said OCR means.

13. The method according to claim 11, wherein said database is remote and functionally associated with said OCR means.

14. The method according to claim 1, wherein a controller facilitates communication between said encoder and said OCR means.

15. The method according to claim 1, wherein said portion comprises one of a country, postal code, county, state, city, street, house number, and addressee name.

16. The method according to claim 1, wherein said step of transmitting said image to an video coding workstation further comprises the step of displaying said image on a portion of a display means.

17. The method according to claim 16, further comprising the step of displaying another image on said display means substantially simultaneously with said image.

18. The method according to claim 1, further comprising the step of verifying if said manually entered alpha/numeric characters correctly reflect said destination address and if said characters do not reflect said destination address rejecting said limited set via said OCR means.

19. The method according to claim 1, further comprising the step of differentiating between addressor and addressee information as being said destination address at said OCR means.

20. The method according to claim 1, further comprising the step of using said OCR means to verify if a database entry is said destination address if said limited set comprises said database entry.

21. The method according to claim 1, further comprising the step of requerying said database for a match of characters in said fixed number of keystrokes and any character unambiguously decode in said step of decoding.

22. The method according to claim 1, wherein said OCR means comprises an OCR process in functional association with OCR software, a database, and a memory.

* * * * *